(12) United States Patent
Tsubaki

(10) Patent No.: US 10,661,825 B2
(45) Date of Patent: May 26, 2020

(54) ELECTRIC POWER STEERING APPARATUS

(71) Applicant: NSK LTD., Tokyo (JP)

(72) Inventor: Takahiro Tsubaki, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/469,395

(22) PCT Filed: Mar. 14, 2018

(86) PCT No.: PCT/JP2018/009861
§ 371 (c)(1),
(2) Date: Jun. 13, 2019

(87) PCT Pub. No.: WO2018/168891
PCT Pub. Date: Sep. 20, 2018

(65) Prior Publication Data
US 2020/0108857 A1    Apr. 9, 2020

(30) Foreign Application Priority Data

Mar. 16, 2017 (JP) ................. 2017-051697
Mar. 16, 2017 (JP) ................. 2017-051698
Mar. 16, 2017 (JP) ................. 2017-051699

(51) Int. Cl.
*B62D 5/04* (2006.01)
*B62D 6/00* (2006.01)
(Continued)

(52) U.S. Cl.
CPC ......... *B62D 5/0463* (2013.01); *B62D 5/0472* (2013.01); *B62D 6/008* (2013.01);
(Continued)

(58) Field of Classification Search
CPC .... B62D 5/0463; B62D 5/0472; B62D 6/008; B62D 15/021; B60W 10/20; B60W 2540/18; B60W 2710/20; B60W 2510/20
See application file for complete search history.

(56) References Cited

U.S. PATENT DOCUMENTS 8,560,174 B2 * 10/2013 Nishimura ........... B62D 5/0463
                                              180/400
9,566,979 B2 *  2/2017 Nishigaki ............. B60W 10/20
(Continued)

FOREIGN PATENT DOCUMENTS

JP   2005-125853 A   5/2005
JP      5208894 B2   6/2013
(Continued)

OTHER PUBLICATIONS

International Preliminary Report on Patentability for PCT/JP2018/009861, dated Feb. 4, 2019.
(Continued)

*Primary Examiner* — Kevin Hurley
*Assistant Examiner* — Marlon A Arce
(74) *Attorney, Agent, or Firm* — Sughrue Mion, PLLC

(57) ABSTRACT

An electric power steering apparatus that easily obtains desired steering torques to a steering angle without being affected by a road surface state and changes of mechanism characteristics of a steering system due to aging. The apparatus includes a target steering torque generating section to generate a target steering torque based on at least one of EPS/vehicle information, a converting section to convert the target steering torque into a target torsional angle, and a torsional angle control section to calculate the current command value based on the target torsional angle, a steering angle, a torsional angle of a torsion bar and a motor angular velocity.

22 Claims, 17 Drawing Sheets

(51) Int. Cl.
 *B62D 15/02* (2006.01)
 *B60W 10/20* (2006.01)
(52) U.S. Cl.
 CPC ......... *B60W 10/20* (2013.01); *B60W 2510/20* (2013.01); *B60W 2540/18* (2013.01); *B60W 2710/20* (2013.01); *B62D 15/021* (2013.01)

(56) References Cited

U.S. PATENT DOCUMENTS

| | | | | |
|---|---|---|---|---|
| 9,919,734 | B2* | 3/2018 | Kitazume | B62D 5/0472 |
| 2016/0001810 | A1* | 1/2016 | Tsubaki | B62D 5/0472 |
| | | | | 701/42 |
| 2018/0186406 | A1* | 7/2018 | Itou | B62D 5/0463 |
| 2019/0002019 | A1* | 1/2019 | Tsubaki | B62D 15/025 |
| 2019/0256133 | A1* | 8/2019 | Tsubaki | B62D 5/0409 |
| 2019/0359248 | A1* | 11/2019 | Tsubaki | B62D 5/0463 |

FOREIGN PATENT DOCUMENTS

| | | |
|---|---|---|
| WO | 2014/136515 A1 | 9/2014 |
| WO | 2014/175052 A1 | 10/2014 |
| WO | 2016/027663 A1 | 2/2016 |
| WO | 2016/072143 A1 | 5/2016 |

OTHER PUBLICATIONS

International Search Report for PCT/JP2018/009861, dated May 15, 2018.

* cited by examiner

PRIOR ART

PRIOR ART

ELECTRIC POWER STEERING APPARATUS

This Application is a National Stage of International Application No. PCT/JP2018/009861 filed Mar. 14, 2018, claiming priority based on Japanese Patent Application Nos. 2017-051697 filed Mar. 16, 2017, 2017-051698 filed Mar. 16, 2017, 2017-051699 filed Mar. 16, 2017.

TECHNICAL FIELD

The present invention relates to a high-performance electric power steering apparatus that obtains a desired steering torque by performing a control so as to follow-up a torsional angle of a torsion bar which is provided in a column shaft (a steering shaft, or a handle shaft) to a value depending on a steering angle, and maintains the desired steering torque without being affected by a road surface state and aging-changes of mechanism system characteristics (friction, a motor output characteristic and the like).

BACKGROUND ART

An electric power steering apparatus (EPS) is existed as an apparatus equipped with a motor control unit. The electric power steering apparatus which provides a steering system of a vehicle with an assist torque (a steering assist torque) by means of a rotational torque of a motor, and applies a driving force of the motor which is controlled by using an electric power supplied from an inverter as the assist torque to a steering shaft or a rack shaft by means of a transmission mechanism including a reduction mechanism. In order to accurately generate the assist torque, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of a duty ratio of a pulse width modulation (PWM) control.

A general configuration of the conventional electric power steering apparatus will be described with reference to FIG. 1. As shown in FIG. 1, a column shaft (a steering shaft or a handle shaft) 2 connected to a handle (a steering wheel) 1 is connected to steered wheels 8L and 8R through a reduction mechanism 3 whose reduction ratio is equal to "1/N", universal joints 4a and 4b, a rack-and-pinion mechanism 5, and tie rods 6a and 6b, further via hub units 7a and 7b. In addition, a torque sensor 10 for detecting a steering torque Ts of the handle 1 and a steering angle sensor 14 for detecting a steering angle θh are provided in the column shaft 2 having a torsion bar, and a motor 20 for assisting a steering force of the handle 1 is connected to the column shaft 2 through the reduction mechanism 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (a steering assist command) based on the steering torque Td detected by the torque sensor 10 and a vehicle speed Vs detected by a vehicle speed sensor 12, and controls a current supplied to the motor 20 for the electric power steering apparatus (EPS) by means of a voltage control command value Vref obtained by performing compensation or the like to the current command value.

A controller area network (CAN) 40 exchanging various information of the vehicle is connected to the control unit 30, and it is possible to receive the vehicle speed Vs from the CAN 40. Further, it is also possible to connect a non-CAN 41 exchanging a communication, analog/digital signals, a radio wave or the like except for the CAN 40 to the control unit 30.

The control unit 30 mainly comprises a central processing unit (CPU) (including a micro controller unit (MCU), a micro processor unit (MPU) and so on), and general functions performed by programs within the CPU are shown in FIG. 2.

The control unit 30 will be described with reference to FIG. 2. As shown in FIG. 2, the steering torque Ts detected by the torque sensor 10 and the vehicle speed Vs detected by the vehicle speed sensor 12 (or from the CAN 40) are inputted into a current command value calculating section 31 that calculates a current command value Iref1. The current command value calculating section 31 calculates the current command value Iref1 that is a control target value of a current supplied to the motor 20 based on the inputted steering torque Ts and vehicle speed Vs and by using an assist map or the like. The current command value Iref1 is inputted into a current limiting section 33 through an adding section 32A. A current command value Irefm whose maximum current is limited is inputted into a subtracting section 32B, and a deviation ΔI (=Irefm−Im) between the current command value Irefm and a motor current Im being fed-back is calculated. The deviation ΔI is inputted into a proportional-integral (PI)-control section 35 for improving a characteristic of the steering operation. The voltage control command value Vref whose characteristic is improved by the PI-control section 35 is inputted into a PWM-control section 36. Furthermore, the motor 20 is PWM-driven through an inverter 37. The motor current Im of the motor 20 is detected by a motor current detector 38 and is fed-back to the subtracting section 32B.

A compensation signal CM from a compensation signal generating section 34 is added to the adding section 32A, and a characteristic compensation of the steering system is performed by the addition of the compensation signal CM so as to improve a convergence, an inertia characteristic and so on. The compensation signal generating section 34 adds a self-aligning torque (SAT) 34-3 and an inertia 34-2 at an adding section 34-4, further adds the added result at the adding section 34-4 with a convergence 34-1 at an adding section 34-5, and then outputs the added result at the adding section 34-5 as the compensation signal CM.

In such a conventional assist control, the steering torque (the torsional torque of the torsion bar) applied by a manual input of a driver is detected by the torque sensor, and the motor current is controlled as the assist current depending on mainly the detected steering torque. However, in this method, different steering torques are generated depending on the steering angle due to the difference of the road surface state (for example, a cant of the road surface). Moreover, the different steering characteristics are obtained depending on variations of the motor output characteristic due to the long-term use.

The apparatus disclosed in, for example, Japanese Patent No. 5208894 (Patent Document 1) is shown as a vehicle control unit to resolve the above problems. The apparatus of Patent Document 1 comprises a steering angle detecting means, a target setting means, and a control means to control the actual steering torque being approximate to the target value of the steering torque which is set by the target setting means, so as to apply the appropriate steering torque based on the tactile characteristic of the driver.

THE LIST OF PRIOR ART DOCUMENTS

Patent Documents

Patent Document 1: Japanese Patent No. 5208894 B2

SUMMARY OF THE INVENTION

Problems to be Solved by the Invention

However, in the apparatus of Patent Document 1, it is required that a relationship between the steering angle and the steering torque is preliminarily obtained based on a relationship between the steering angle or the steering torque and a tactile amount (a grip force). The complicate operation that the steering torque corresponding to the steering angle based on the above relationship is set as the target value, is occurred. Further, the apparatus of Patent Document 1 uses the PI-control to the deviation between the target value of the steering torque and the detected steering torque.

The present invention has been developed in view of the above-described circumstances, and an object of the present invention is to provide an electric power steering apparatus that easily obtains desired steering torques to a steering angle without being affected by a road surface state and aging-changes of mechanism characteristics of a steering system (friction, a motor output characteristic and the like).

Means for Solving the Problems

The present invention relates to an electric power steering apparatus that has a torsion bar in a column shaft of a handle of a vehicle, and assist-controls a steering system by driving and controlling a motor connected to the column shaft based on a current command value, the above-described object of the present invention is achieved by that: comprising a target steering torque generating section to generate a target steering torque based on at least one of electric power steering (EPS)/vehicle information, a converting section to convert the target steering torque into a target torsional angle, and a torsional angle control section to calculate the current command value based on the target torsional angle, a steering angle, a torsional angle of the torsion bar and a motor angular velocity or a column angular velocity, wherein the electric power steering apparatus performs a control so as to follow-up the torsional angle to the target torsional angle.

Effects of the Invention

According to the electric power steering apparatus of the present invention, by generating the target torsional angle from the steering angle and controlling the torsional angular velocity by using the result, which is multiplied a deviation between the target torsional angle and the detected torsional angle with a compensation value (a transfer function) or a position control gain, as the target torsional angular velocity, the torsional angle can be operated so as to follow-up the target torsional angle, and the desired steering torque to the steering angle can be obtained without the complicated operation.

According to a steering angle disturbance compensating section, the affection to the torsion bar torsional angle due to the change of the steering angle inputted from the driver can be suppressed, and the followability of the torsional angle to the target torsional angle against the abrupt steering can be improved.

MODE FOR CARRYING OUT THE INVENTION

The present invention is an electric power steering apparatus to obtain a desired steering torque to a steering angle without being affecting a road surface state, and obtains the desired steering torque by performing a control so as to follow-up a torsional angle of a torsion bar, which is provided in a column shaft, to a value depending on the steering angle.

Embodiments of the present invention will be described with reference to the accompanying drawings.

Figure 1:
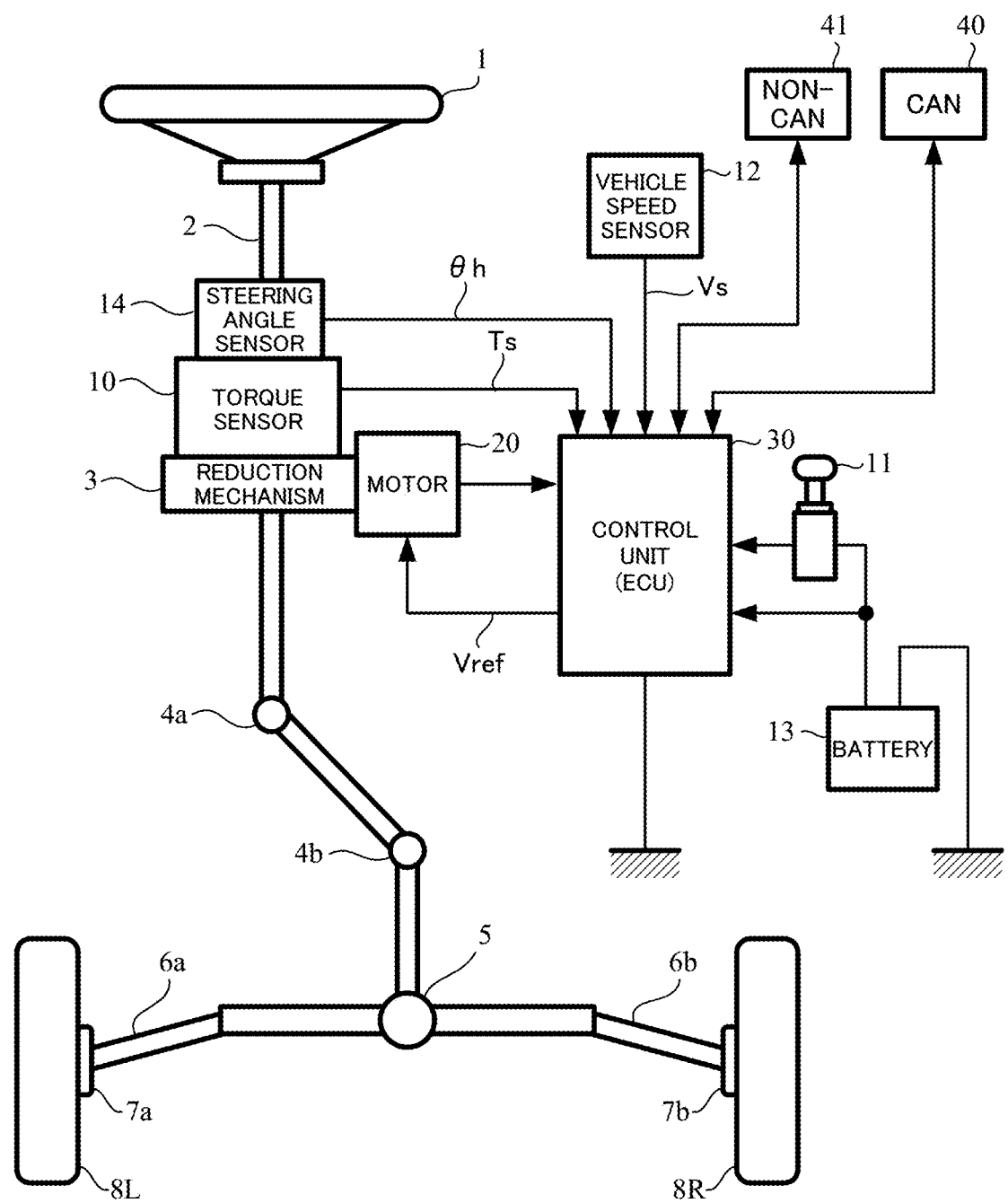
FIG. 1 is a configuration diagram illustrating a general outline of a conventional electric power steering apparatus (EPS)
Figure 2:
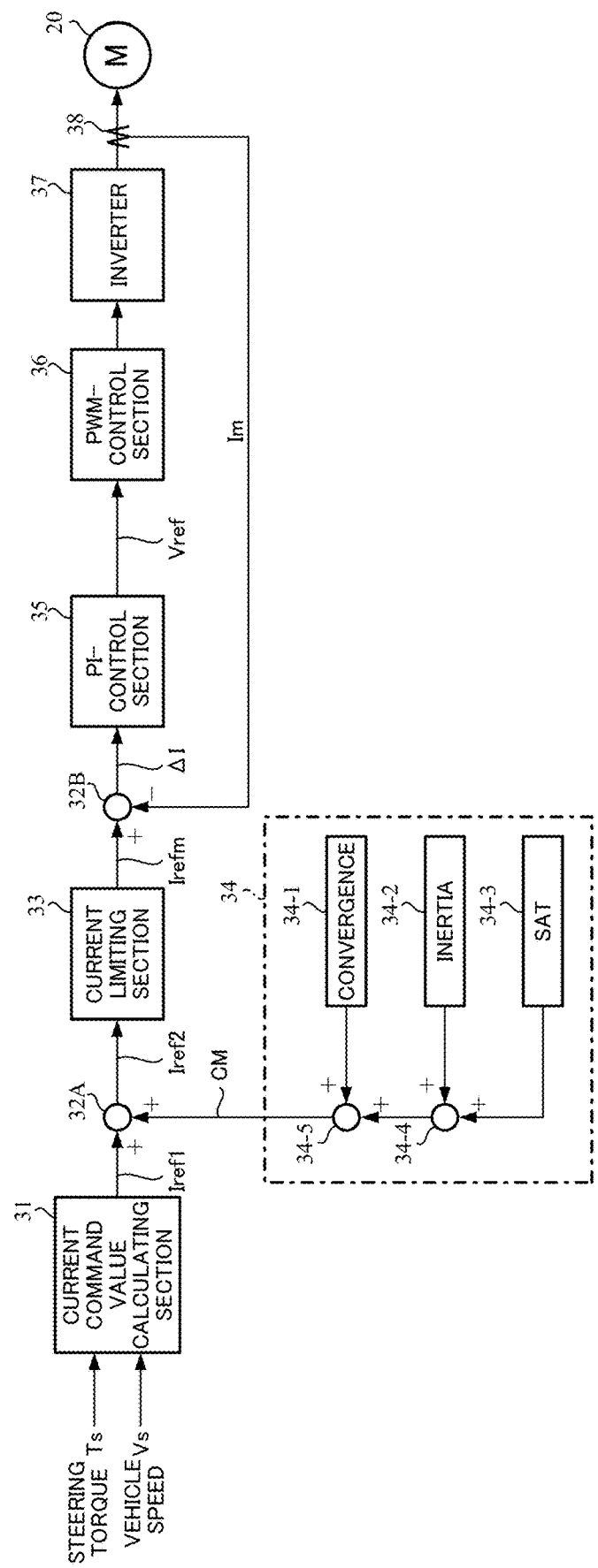
FIG. 2 is a block diagram showing a configuration example of a control unit (ECU) of the electric power steering apparatus.
Figure 3:
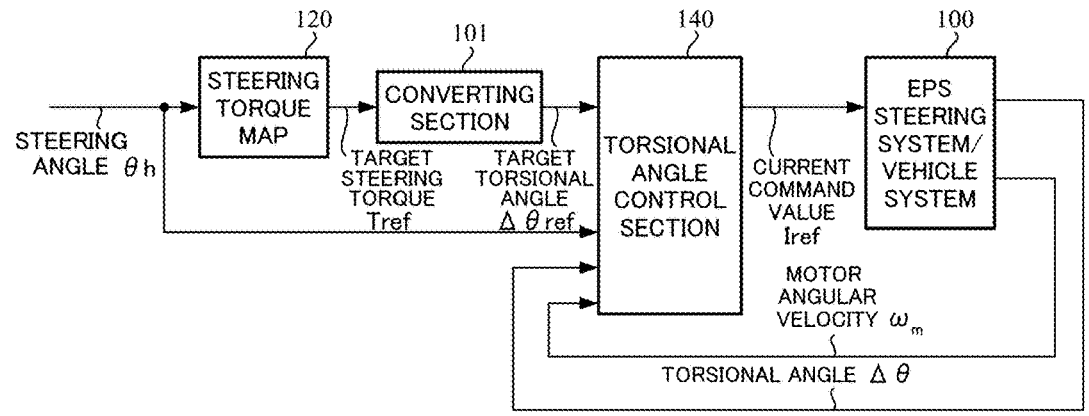
FIG. 3 is a block diagram showing a basic configuration of the present invention.

FIG. 3 is a block diagram showing a basic configuration of the present invention, and a handle steering of a driver is assist-controlled by a motor in an EPS steering system/vehicle system 100. The steering angle θh is inputted into a steering torque map 120 and a target steering torque Tref depending on the steering angle θh is outputted from the steering torque map 120. The target steering torque Tref is converted into a target torsional angle Δθref at a converting section 101 having a characteristic of "−1/Ktor" in a case that a spring constant of the torsion bar 2A provided in the column shaft 2 is defined as "Ktor". The target torsional angle Δθref is inputted into a torsional angle control section 140. The target torsional angle Δθref, the steering angle θh, the torsional angle Δθ and a motor angular velocity ωm are inputted into the torsional angle control section 140, and the torsional angle control section 140 calculates a current command value Iref so that the torsional angle Δθ becomes the target torsional angle Δθref. The motor of the EPS is driven by the current command value Iref.

Figure 4:
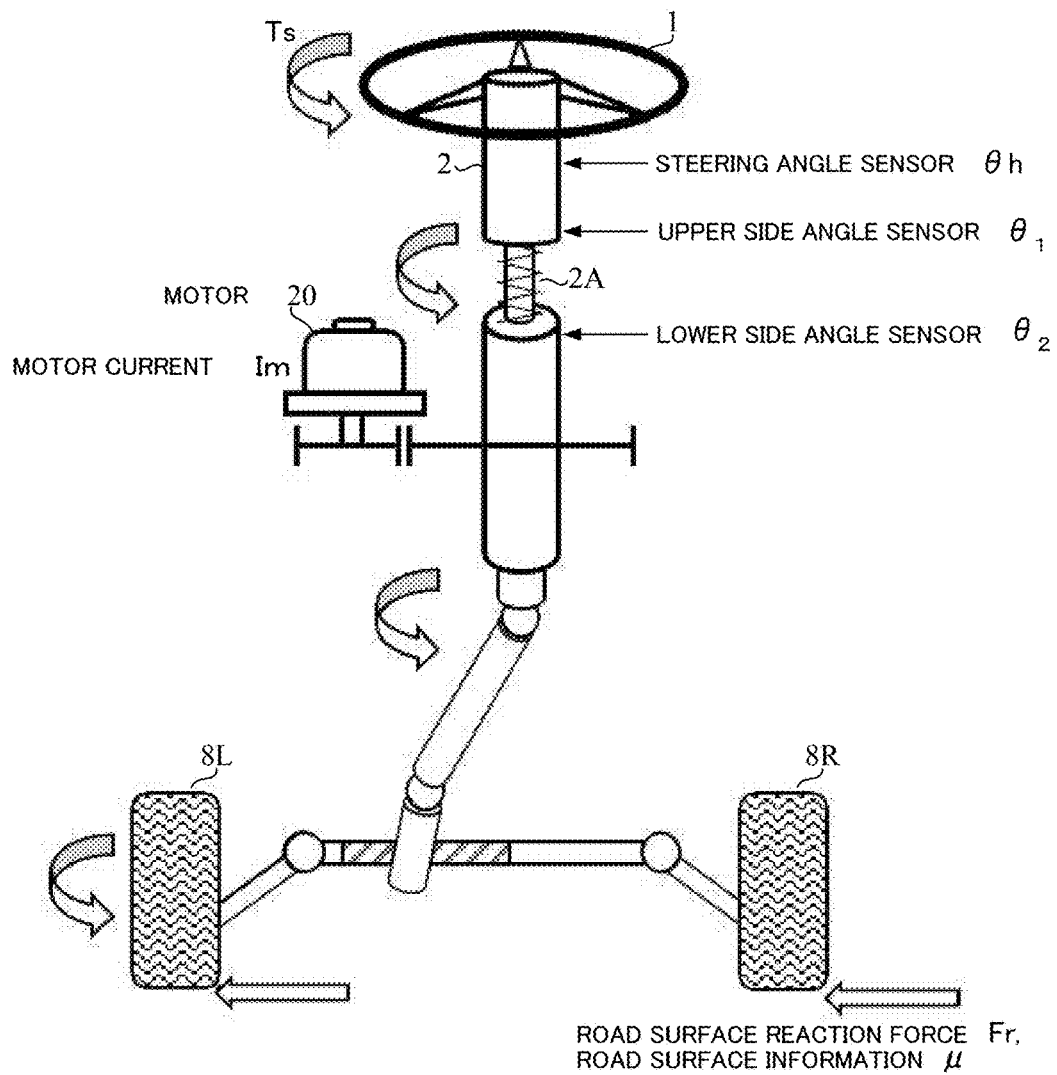
FIG. 4 is a structural diagram showing an installation example of an EPS steering system and various sensors.

An installation example of the EPS steering system and various sensors is shown in FIG. 4, and the torsion bar 2A is provided in the column shaft 2. A road surface reaction force Fr and a road surface information p are operated to steered wheels 8L and 8R. An upper-side angle sensor (an angle $\theta_1$) is disposed at a handle side of the column shaft 2 above the torsion bar 2A, and a lower-side angle sensor (an angle $\theta_2$) is disposed at a steered wheel side of the column shaft 2 below the torsion bar 2A. The steering angle θh is detected by the steering angle sensor 14 disposed at an upper portion of the column shaft 2. The torsion bar torsional angle Δθ and the torsion bar torque Tt can be calculated by following Expressions 1 and 2 from a deviation between the angle $\theta_1$ of the upper-side angle sensor and the angle $\theta_2$ of the lower-side angle sensor. In the Expression 2, "Ktor" is a spring constant of the torsion bar 2A.

$$\theta_2 - \theta_1 = \Delta\theta \quad \text{[Expression 1]}$$

$$Ktor \cdot \Delta\theta = Tt \quad \text{[Expression 2]}$$

The torsion bar torque Tt can be detected by using the torque sensor disclosed in, for example, Japanese Unexamined Patent Publication No. 2008-216172 A.

Figure 5:
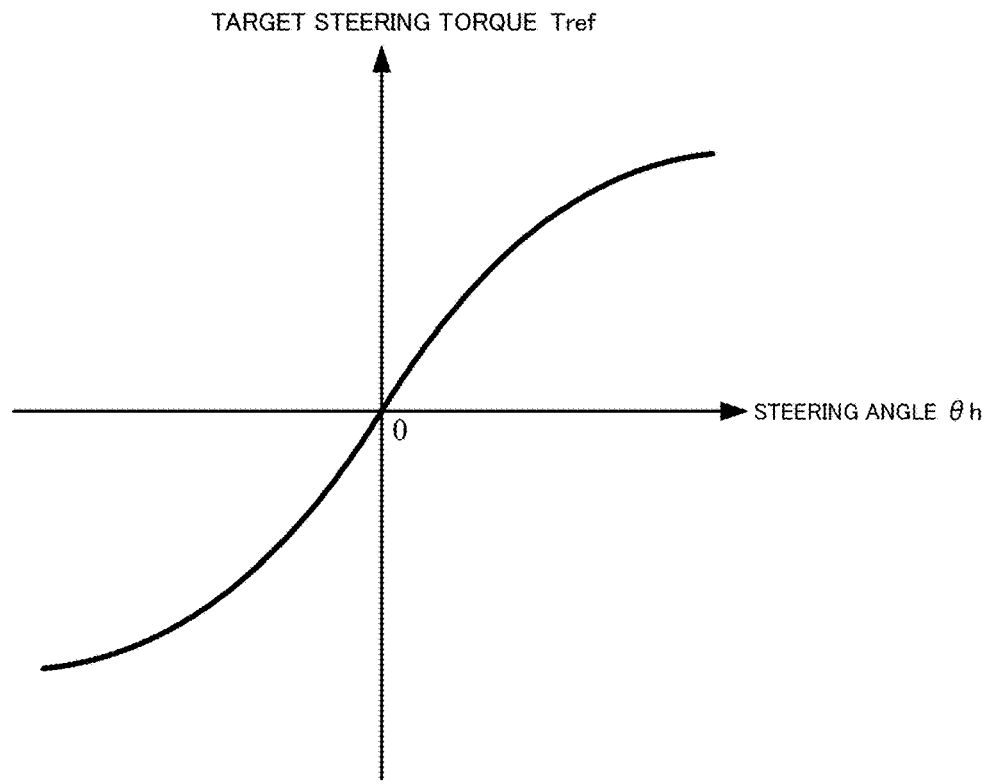
FIG. 5 is a graph showing a characteristic example of a steering torque map.

The steering torque map 120 has a characteristic shown in FIG. 5 that the target steering torque Tref gradually becomes larger when the steering angle θh becomes larger (in a positive or negative direction). The steering torque map 120 may be sensitive to the vehicle speed Vs. In this case, the steering torque map 120 has a characteristic that the target steering torque Tref becomes larger when the vehicle speed Vs becomes higher.

In such a configuration, an operation example of the present invention will be described with reference to a flowchart of FIG. 6.

At first, the steering angle θh is inputted into the steering torque map 120 served as a target steering torque generating section (Step S1), and the steering torque map 120 generates the target steering torque Tref in accordance with a map characteristic shown in FIG. 5 (Step S10). The target steering torque Tref is inputted into the converting section 101, and the converting section 101 converts the target steering torque Tref into the target torsional angle Δθref (Step S30). The target torsional angle Δθref, the steering angle θh, the torsional angle Δθ and the motor angular velocity ωm are inputted into the torsional angle control section 140 (Step S31). The torsional angle control section 140 calculates the current command value Iref so as to follow-up the torsional angle Δθ to the target torsional angle Δθref (Step S40), drives the motor based on the current command value Iref, and performs the current control (Step S60).

Figure 6:
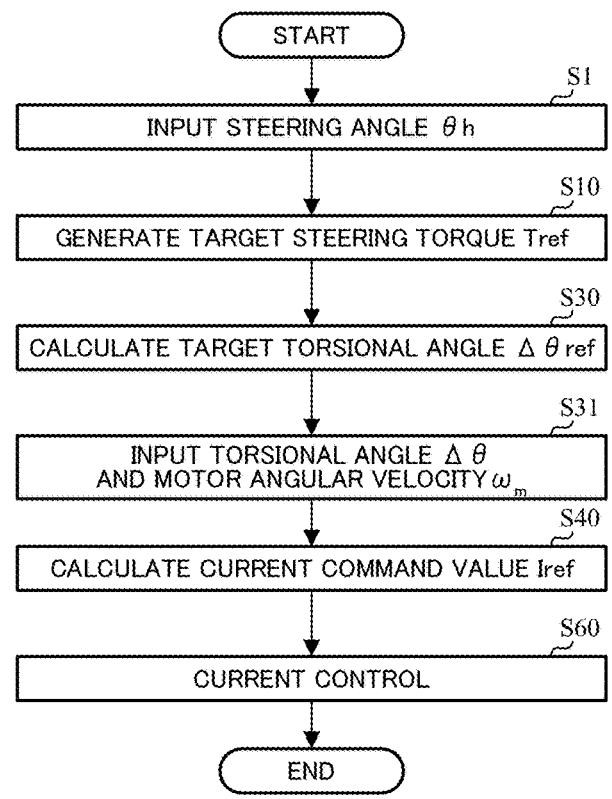
FIG. 6 is a flowchart showing a basic operation example of the present invention.

As well, an input order of the data in FIG. 6 is appropriately changeable.

Figure 7:
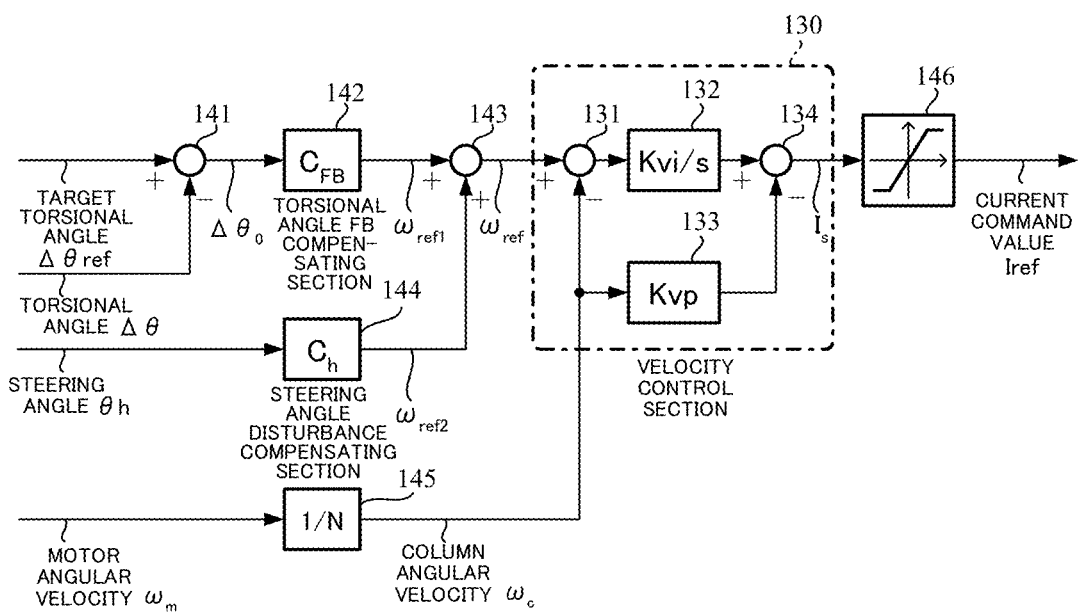
FIG. 7 is a block diagram showing a configuration example of a torsional angle control section (the first embodiment)

FIG. 7 is a block diagram showing a configuration example of the torsional angle control section 140 (the first embodiment). A deviation $\Delta\theta_0$ between the target torsional angle Δθref and the torsional angle Δθ is calculated at a subtracting section 141, and is inputted into a torsional angle feedback (FB) compensating section 142 having a compensation value $C_{FB}$ (a transfer function). The torsional angle feedback compensating section 142 multiplies the deviation $\Delta\theta_0$ with the compensation value $C_{FB}$ (the transfer function) and outputs a target angular velocity ωref1 so as to follow-up the torsional angle Δθ to the target torsional angle Δθref. The target angular velocity ωref1 is inputted into an adding section 143. The compensation value $C_{FB}$ may be a simple gain $K_{pp}$ which is described in the second embodiment, a compensation value of a PI-control or the like.

The steering angle θh is inputted into a steering angle disturbance compensating section 144 having the compensation value Ch (the transfer function). The steering angle disturbance compensating section 144 multiplies the steering angle θh with the compensation value Ch (the transfer function), and outputs the target angular velocity ωref2. By using the steering angle disturbance compensating section 144, affection to the torsion bar torsional angle Δθ due to changing of the steering angle θh inputted from the driver can be suppressed, and the followability of the torsional angle Δθ to the target torsional angle Δθref against an abrupt steering can be improved. The target angular velocities ωref1 and ωref2 are added at an adding section 143, and the added result is defined as the target angular velocity ωref. The target angular velocity ωref is inputted into a velocity control section 130 which performs a proportional preceding-type PI-control (an I-P control). When the steering angle θh is changed by the steering of the driver, the above change is affected to the torsional angle Δθ as the disturbance, and a variation to the target steering angle Δθref is occurred. Especially, this variation is remarkably appeared in the abrupt steering. A basic object of the steering angle disturbance compensating section 144 is to reduce the affection to the steering angle θh as this disturbance. Since the transfer function Ch of the steering angle disturbance compensating section 144 is determined by the frequency transfer characteristic of a plant model described below, and the like, the affection of the disturbance can be suppressed.

The velocity control section 130 which performs the I-P control calculates the current command value Is so as to follow-up a column angular velocity ωc to the target angular velocity ωref. As shown in FIG. 7, the column angular velocity ωc may be calculated by multiplying the motor angular velocity ωm with the reduction ratio "1/N" of a reduction ratio section 145 which is the reduction mechanism. A limiter 146 that limits the current command value Is from the velocity control section 130 using the upper and lower limit values, and outputs the current command value Iref, is disposed at a subsequent stage of the velocity control section 130.

Figure 8:
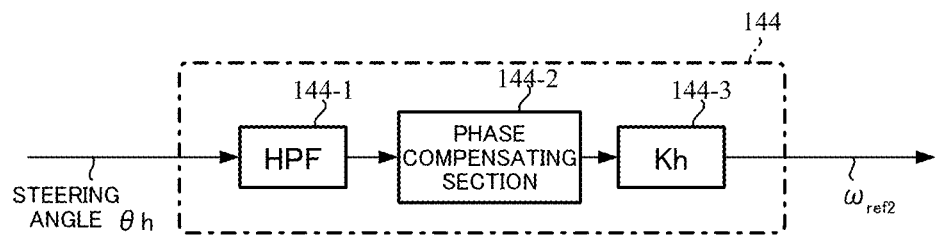
FIG. 8 is a block diagram showing a configuration example of a steering angle disturbance compensating section.

The steering angle disturbance compensating section 144 has a configuration shown in FIG. 8, comprises a high pass filter (HPF) 144-1 into which the steering angle θh is inputted, a phase compensating section 144-2 which is disposed at a subsequent stage of the HPF 144-1 and performs a phase compensation and a gain section 144-3 by which the gain Kh is multiplied, and outputs the target angular velocity ωref2 according to a changing amount of the steering angle θh (an equivalent value of the steering angular velocity). The HPF 144-1 removes a noise which is relevant to the torque following-up control. The gain Kh of the gain section 144-3 is set so that the equivalent value of the differential of the steering angle θh is substantially coincident with the equivalent value that the motor velocity is converted into the velocity in the column shaft. In order to reduce the affection of the high frequency noise in the steering angle θh, a low pass filter (LPF) which enables to remove the noise may be interposed at a subsequent stage of the HPF 144-1. By using the steering angle disturbance compensating section 144, the affection to the torsion bar torsional angle Δθ due to the changing of the steering angle θh inputted from the driver can be suppressed.

Figure 9:
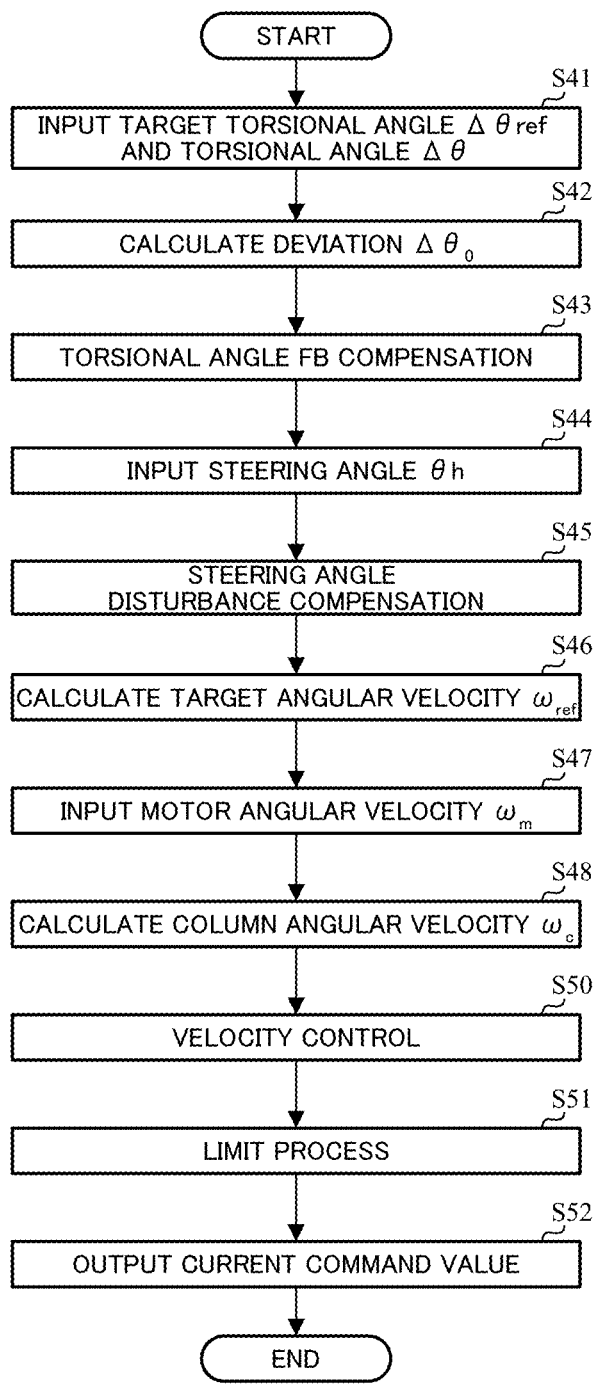
FIG. 9 is a flowchart showing an operation example of the torsional angle control section (the first embodiment)

In such a configuration, an operation example of the torsional angle control section 140 (Step S40 in FIG. 6) will be described with reference to the flowchart of FIG. 9.

At first, the target torsional angle Δθref and the torsional angle Δθ are inputted into the subtracting section 141 (Step S41), and the subtracting section 141 calculates the deviation Δθ$_0$ (Step S42). The deviation Δθ$_0$ is inputted into the torsional angle feedback (FB) compensating section 142 and is compensated (Step S43), and the compensated target angular velocity ωref1 is inputted into the adding section 143. Next, the steering angle θh is inputted into the steering angle disturbance compensating section 144 (Step S44) and is compensated (Step S45), and the compensated target angular velocity ωref2 is inputted into the adding section 143 (Step S46). The target angular velocity ωref which is the added result at the adding section 143 is inputted into the velocity control section 130.

As shown in FIG. 8, in the steering angle disturbance compensating section 144, at first, the steering angle θh is high-pass-processed at the HPF 144-1. Next, the processed steering angle is phase-compensated at the phase compensating section 144-2, and then the phase-compensated steering angle is multiplied with the gain Kh at the gain section 144-3. In this example, the phase compensation is performed after the steering angle θh is high-pass-processed. Alternatively, the steering angle θh may be phase-compensated and then the high pass process may be performed to the phase-compensated steering angle.

Further, the motor angular velocity ωm is multiplied with the reduction ratio "1/N" at the reduction ratio section 145 (Step S47), and the column angular velocity ωc which is a multiplied result is inputted into the velocity control section 130 (Step S48). A difference between the target angular velocity ωref and the column angular velocity ωc is obtained at the subtracting section 131. The difference is integrated (Kvi/s) at the integral section 132 and the integrated result is addition-inputted into the subtracting section 134 (Step S50). The proportional process (Kvp) is performed to the column angular velocity ωc at the proportional section 133, and the proportional-processed result is subtraction-inputted into the subtracting section 134 (Step S50). The current command value Is which is a subtracted result at the subtracting section 134 is inputted into the limiter 146, and the limiter 146 limits the upper and lower values of the current command value Is (Step S51). The current command value Iref for the motor control is outputted from the limiter 146 (Step S52).

If the torsional angle control section 140 comprises the torsional angle feedback compensating section 142 and the velocity control section 130, basically, the torsional angle Δθ can follow-up the target torsional angle Δθref, and the desired steering torque can be obtained.

Next, an effect of the steering angle disturbance compensating section 144 will be described.

Figure 10:
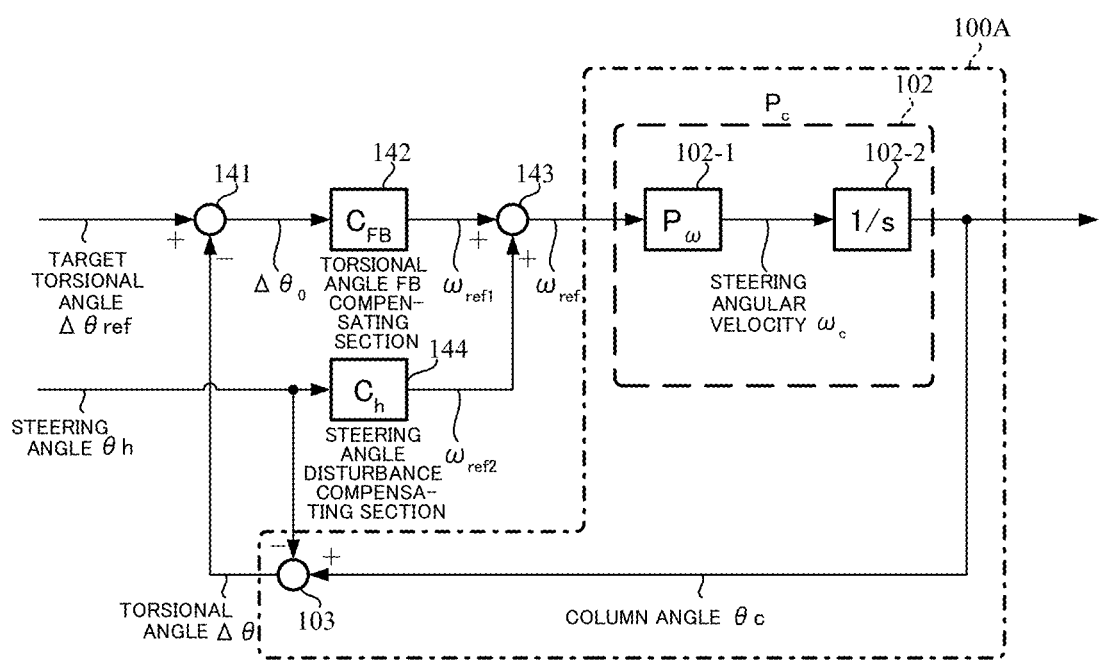
FIG. 10 is a block diagram showing an EPS plant for explaining an effect of the steering angle disturbance compensating section.

As shown in FIG. 10, in an overall system that an EPS steering system/vehicle system 100 includes the velocity control section 130, the target angular velocity ωref is set as an input, the column angle θc and the torsional angle Δθ are set as an output, and "Pc" is set as the transfer function model of the overall system including the velocity control section 130. The torsional angle Δθ is simply a difference (θc−θh) between the column angle θc and the steering angle θh, and is obtained at the subtracting section 103. A transfer function block (Pω) 102-1 including the EPS steering system/vehicle system 100 and the velocity control section 130 is a transfer function model whose input is the target angular velocity ωref and whose output is the column angular velocity ωc, and also includes an EPS mechanism system characteristics such as the spring constant Ktor of the torsion bar 2A and the column inertia, and a dynamic characteristic model of the vehicle. The transfer function block (Pω) 102-1 may or may not include a stabilization compensating section for a high frequency band. By time-integrating the column angular velocity ωc at an integral block 102-2, the column angle θc can be obtained.

Based on FIG. 10, the torsional angle Δθ is expressed by the target torsional angle Δθref, the transfer function $C_{FB}$ of the torsional angle feedback compensating section 142, the transfer function Ch of the steering angle disturbance compensating section 144 and the transfer function Pc of the overall system, and then the following Expression 3 is obtained.

$$\Delta\theta = \frac{C_{FB}P_c}{1+C_{FB}P_c}\Delta\theta_{ref} + \frac{C_hP_c-1}{1+C_{FB}P_c}\theta_h \quad [\text{Expression 3}]$$

The first term of the Expression 3 denotes the followability of the torsional angle Δθ to the target torsional angle Δθref, and the second term of the Expression 3 denotes the disturbance characteristic of the steering angle θh to the torsional angle Δθ. If the second term of the Expression 3 is set to "0", theoretically, since the disturbance caused by the steering angle θh can be removed, the transfer function Ch of the steering angle disturbance compensating section 144 may be set as an Expression 4. That is, if the transfer function Ch of the steering angle disturbance compensating section 144 is set so as to satisfy the Expression 4, the affection of the disturbance due to the steering angle θh can be suppressed.

$$C_h = \frac{1}{P_c} \quad [\text{Expression 4}]$$

Next, a setting method of the transfer function Ch of the steering angle disturbance compensating section 144 will be described.

Figure 11A:
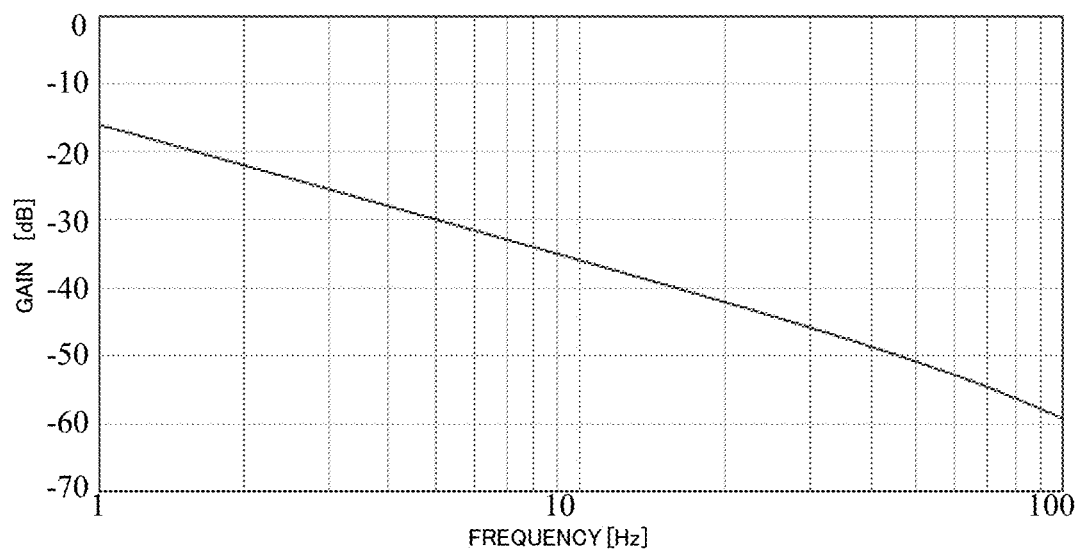
FIGS. 11A and 11B are a Bode diagram explaining a setting method of a steering angle disturbance compensation value.
Figure 11B:
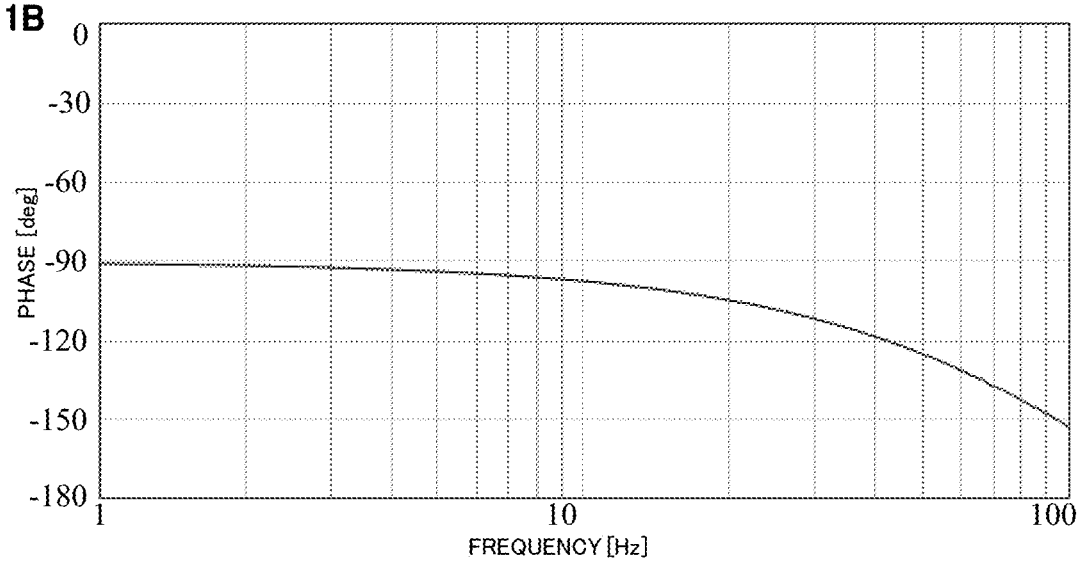
Figure 12A:
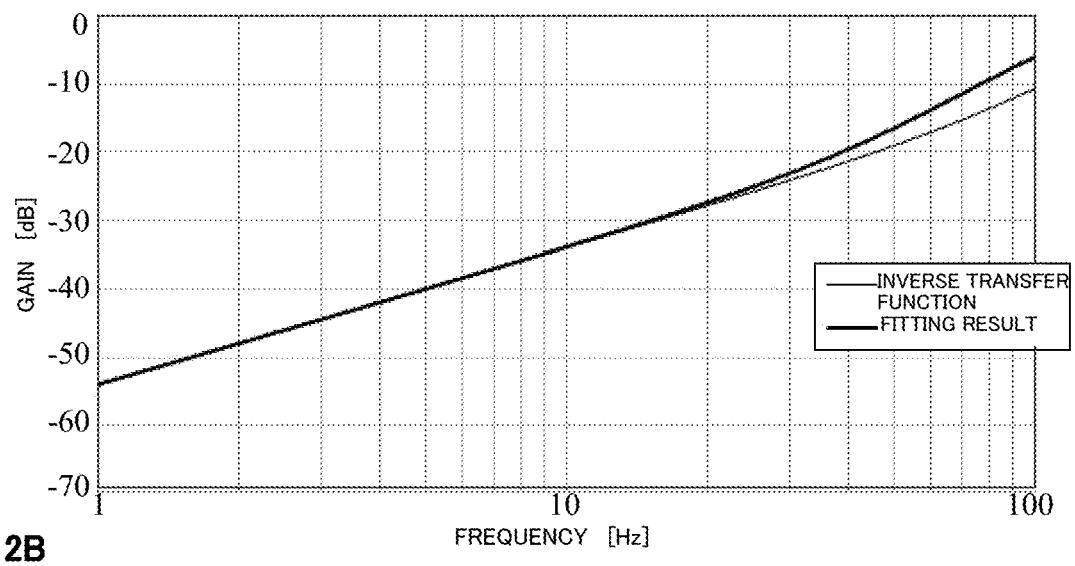
FIGS. 12A and 12B are a Bode diagram showing an inverse transfer function to an identification result and a fitting result.
Figure 12B:
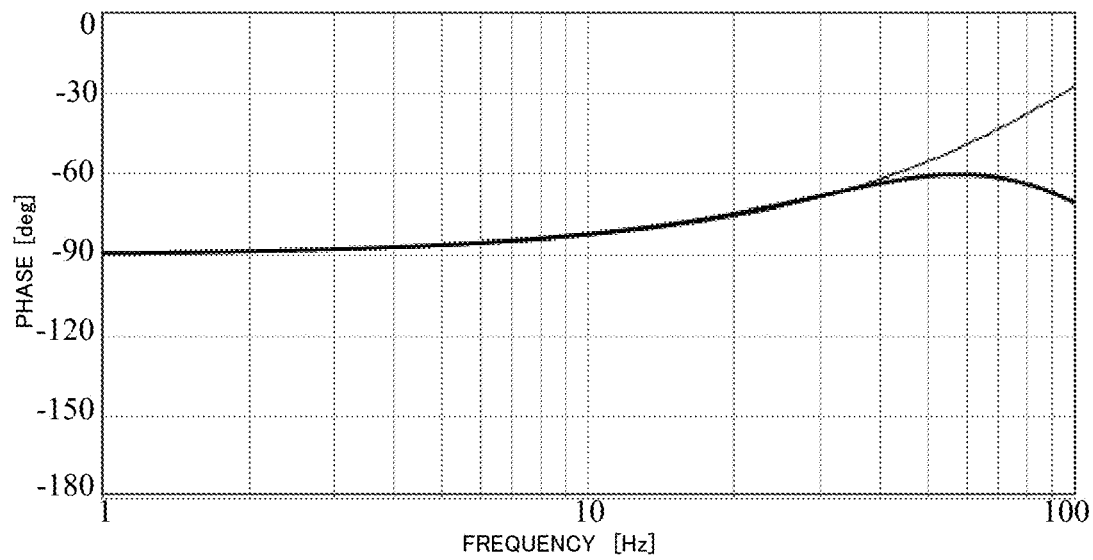

One example of the identification result of the frequency characteristic Pc from the target angular velocity ωref to the column angle θc is a Bode diagram of FIGS. 11A and 11B. Further, one example of an inverse function to this identification result which is the Expression 4, and a fitting result to the inverse function is shown in FIGS. 12A and 12B. In FIGS. 12A and 12B, the inverse function is shown by a thin line, and the fitting result is shown by a thick line. As understood from FIGS. 12A and 12B, in the fitting result, the phase is suppressed around a region from 30 [Hz] to 100 [Hz] and the gain is larger. The fitted transfer function is set as a third-order filter shown in the following Expression 5. Coefficients of a numerator $b_3$ to $b_0$ and coefficients of a denominator $a_3$ to $a_0$ are obtained by the iterative calculation so that the gain and the phase of the filter which has the coefficients of the filter are coincident with the gain and the phase of the thin lines of FIGS. 12A and 12B.

$$G_{FIT} = \frac{b_3 s^3 + b_2 s^s + b_1 s + b_0}{a_3 s^3 + a_2 s^s + a_1 s + a_0} \quad \text{[Expression 5]}$$

$b_3$ $9.0000 \times 10^0$ $a_3$ $1.5915 \times 10^{-3}$
$b_2$ $5.0894 \times 10^3$ $a_2$ $3.7000 \times 10^0$
$b_1$ $8.8826 \times 10^5$ $a_3$ $3.1102 \times 10^3$
$b_0$ $0.0000 \times 10^0$ $a_0$ $8.8826 \times 10^5$ The above fitting results are set as the transfer function Ch of the steering angle disturbance compensating section 144.

Figure 13:
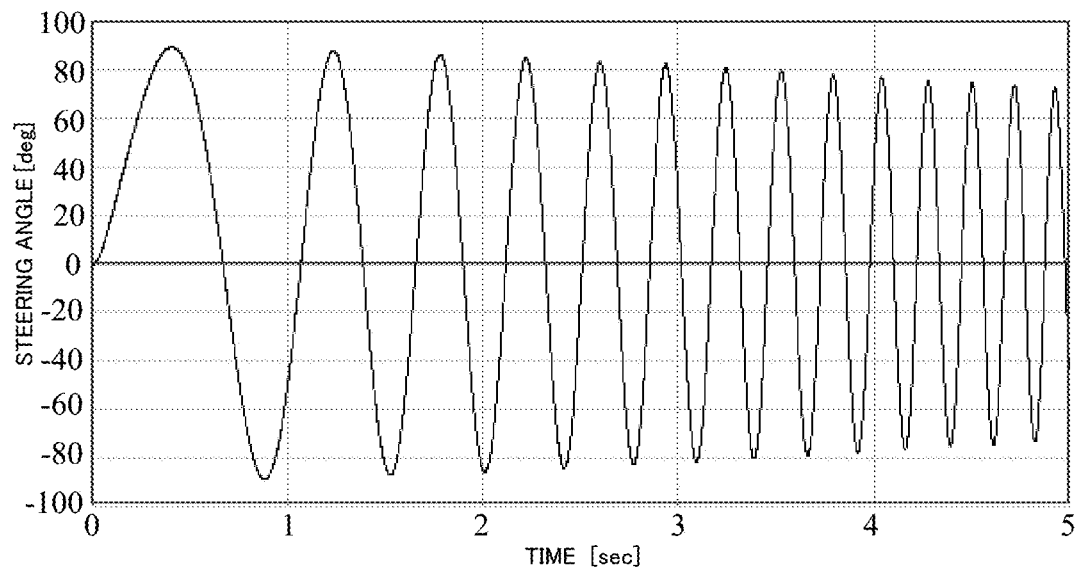
FIG. 13 is a conceptual diagram showing an effect by the steering angle disturbance compensating section.
Figure 14:
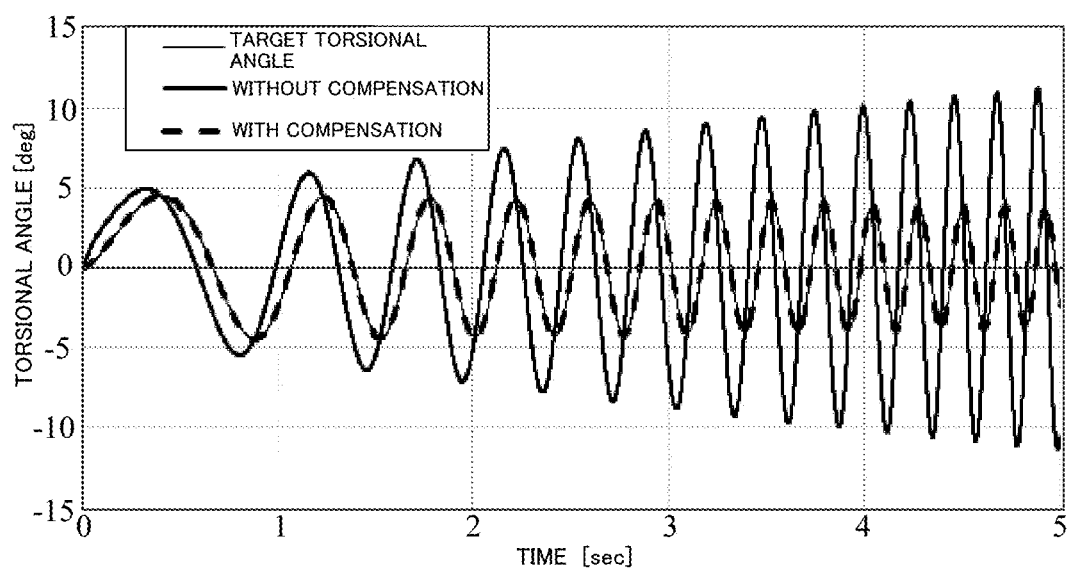
FIG. 14 is a waveform chart showing a difference between with compensation to a target torsional angle and without compensation.

Next, an effect of the steering angle disturbance compensating section 144 will be described using a conceptual diagram. The setting of target steering torque generating section is performed at only the basic map. The linear target steering torque is set so that the target torsional angle Δθref becomes 5 [deg] when the steering angle θh is 100 [deg]. FIG. 13 shows a time response of the steering angle θh as the steering input and the disturbance. When the time is varied from 0 [sec] to 5 [sec], the frequency component becomes higher. That is, it is assumed that the input is the abrupt steering. When the steering angle θh shown in FIG. 13 is used in both cases that the steering angle disturbance compensation is performed and is not performed, the results shown in FIG. 14 are obtained. Because the lines are overlapped in FIG. 14, it seems that the distinction of the lines is difficult. In a case that the steering angle disturbance compensation to the target torsional angle is not performed, the characteristic (the bold line) is largely deviated to the target torsional angle. In contrast, in a case that the steering angle disturbance compensation to the target torsional angle is performed, it is understood that the characteristic (the broken line) precisely follows-up the target torsional angle (the thin line). Even in a case of the abrupt steering, the characteristic shown by the broken line follows-up the target torsional angle, and the desired steering torque is obtained.

Figure 15:
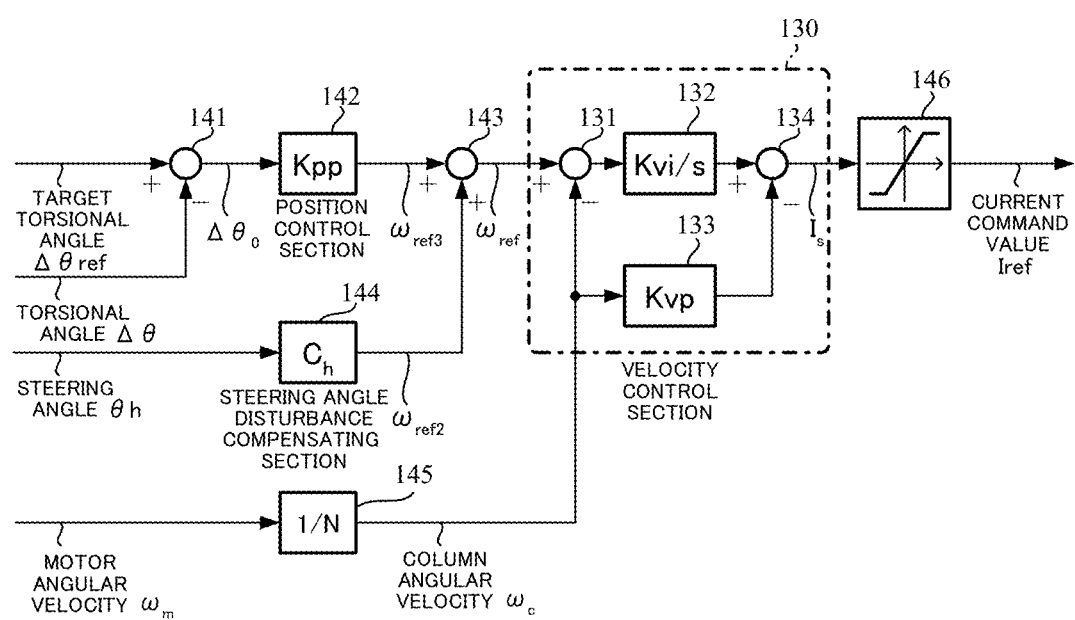
FIG. 15 is a block diagram showing a configuration example of the torsional angle control section (the second embodiment)

In the above-described first embodiment, the target angular velocity ωref1 is calculated by multiplying the deviation Δθ$_0$ with the compensation value $C_{FB}$ (the transfer function) at the torsional angle feedback compensating section 142. As shown in FIG. 15, the above target angular velocity may be calculated at a position control section 142A having a position control gain Kpp (a transfer function) (the second embodiment).

Figure 16:
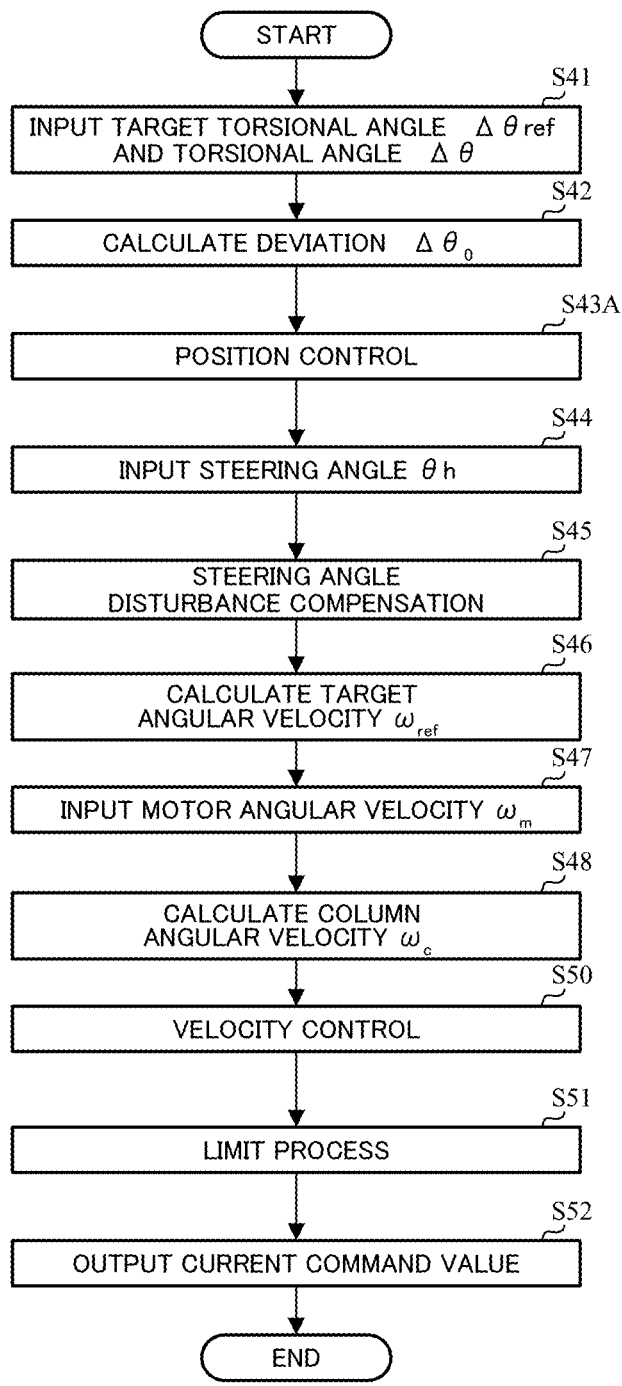
FIG. 16 is a flowchart showing an operation example of the torsional angle control section (the second embodiment)

In the second embodiment, other configurations are the same as those of the first embodiment in FIG. 7. The operation example is shown in FIG. 16. The operation example of the second embodiment is almost the same as that of the first embodiment shown in FIG. 9. In the second embodiment, the deviation Δθ$_0$ is calculated at the subtracting section 141 (Step S42), and then the deviation Δθ$_0$ is inputted into the position control section 142A and is compensated (Step S43A). The compensated target angular velocity ωref3 is inputted into the adding section 143. The subsequent operations are the same as those in FIG. 9.

An effect of the second embodiment will be described, shown in FIGS. 17A and 17B.

Figure 17A:
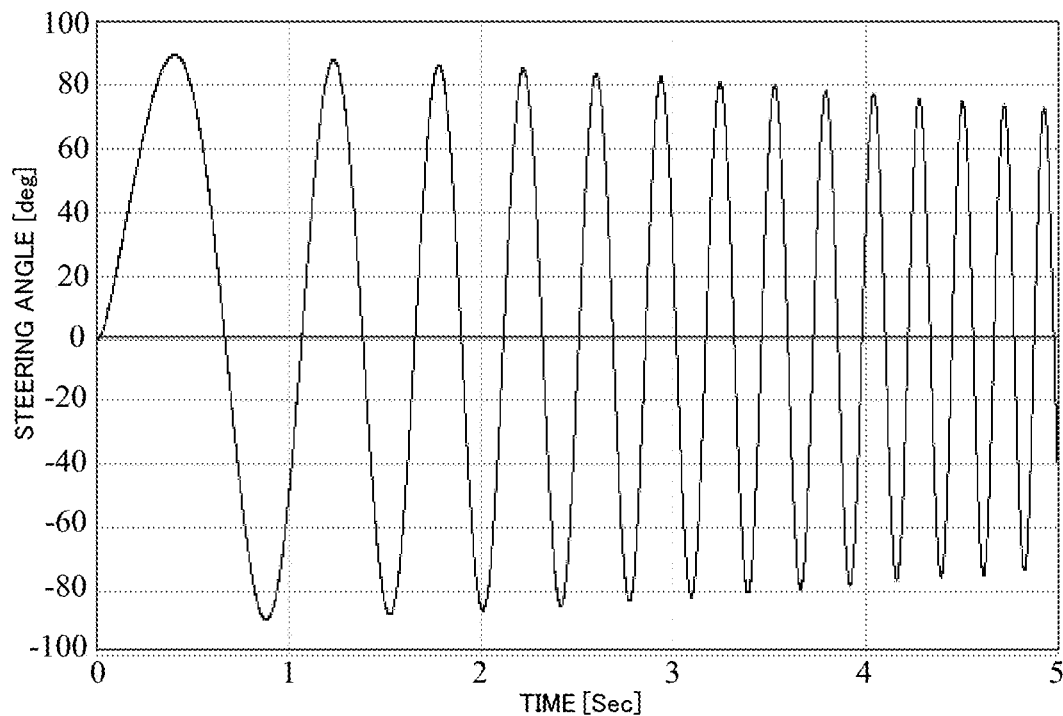
FIGS. 17A and 17B are waveform charts showing an effect of the second embodiment.
Figure 17B:
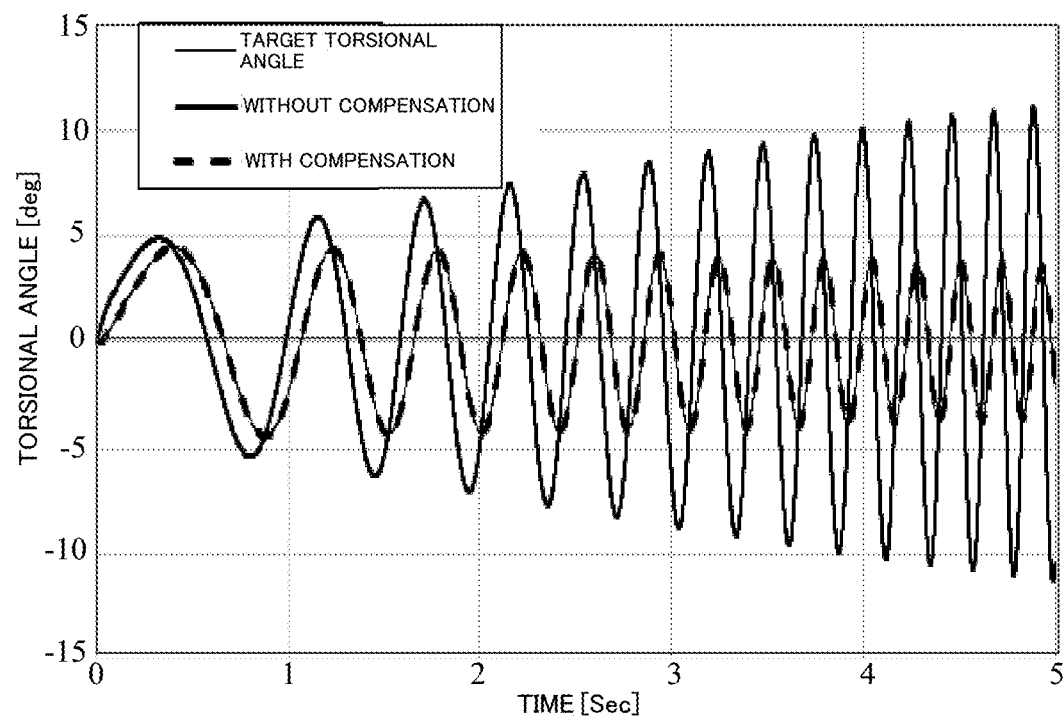

In a case that the steering angle θh is behaved shown in FIG. 17A, the target steering torque Tref shown by the thin line of FIG. 17B is outputted from the steering torque map 120. The target torsional angle Δθref is calculated by a relational expression between the target steering torque Tref and the spring constant Ktor of the torsion bar. Because the lines are overlapped in FIG. 17B, it seems that the distinction of the lines is difficult. Compared with a case that the steering angle disturbance compensating section is not existed (the bold line), in a case that the steering angle disturbance compensating section is disposed, it is understood that the torsional angle (the broken line) operates to follow-up the target steering angle (the thin line).

Figure 18:
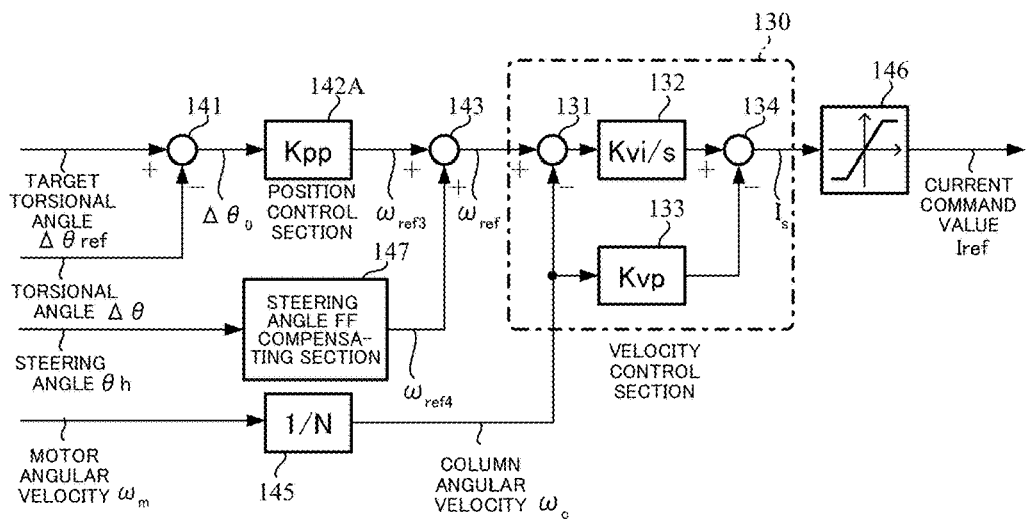
FIG. 18 is a block diagram showing a configuration example of the torsional angle control section (the third embodiment)

In the above-described first and second embodiments, the target angular velocity ωref2 is obtained by performing the compensation to the steering angle θh at the steering angle disturbance compensating section 144. As shown in FIG. 18, the target angular velocity ωref4 may be obtained at the steering angle feedforward (FF) compensating section 147 (the third embodiment).

Figure 19A:
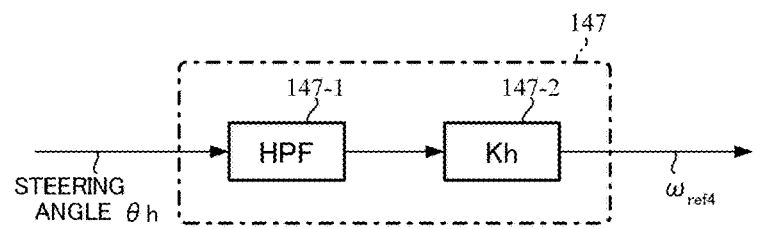
FIGS. 19A and 19B are block diagrams showing a configuration example of a steering angle feedforward (FF) section.
Figure 19B:
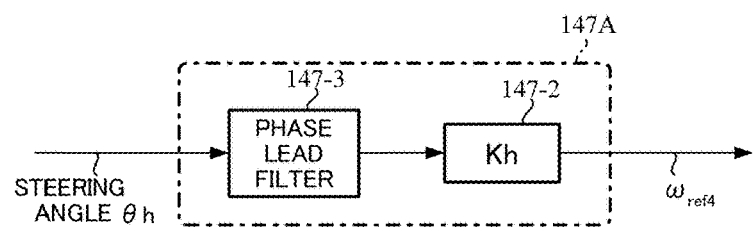

That is, in the third embodiment, the steering angle θh is inputted into the steering angle feedforward (FF) compensating section 147, and the steering angle feedforward (FF) compensating section 147 performs the compensation to the steering angle θh and outputs the target angular velocity ωref4. The steering angle feedforward (FF) compensating section 147 has a configuration shown in FIG. 19A or FIG. 19B. In the configuration example of FIG. 19A, the steering angle θh is high-pass-processed at the high pass filter (HPF) 147-1 which removes the noise relevant to the torque following-up control, and the gain section 147-2 multiplies the processed steering angle with the gain Kh, and outputs the target angular velocity ωref4 which is the changing amount of the steering angle θh (the equivalent value of the steering angular velocity). In the configuration example of FIG. 19B, the steering angle θh is performed by the calculation equivalent to the differential, the phase lead compensation or the like at the phase lead filter 147-3. The gain section 147-2 multiplies the above processed steering angle with the gain Kh, and outputs the target angular velocity ωref4 which is the changing amount of the steering angle θh (the equivalent value of the steering angular velocity). The phase lead filter 147-3 removes the noise relevant to the torque following-up control. The gain Kh is set so that the equivalent value of the differential of the steering angle θh is substantially coincident with the equivalent value that the motor velocity is converted into the velocity in the column shaft. In order to reduce the affection of the high frequency noise of the steering angle θh, the low pass filter (LPF) which can remove the noise may be interposed at a subsequent stage of the HPF 147-1. By using the steering angle feedforward compensating section 147, the affection to the torsion bar torsional angle Δθ due to the changing of the steering angle θh inputted from the driver can be suppressed.

As well, if the above-described HPF and phase lead filter have a practical effect, those filters are not limited to a primary filter, and may be configured by a second order or higher filter.

Figure 20:
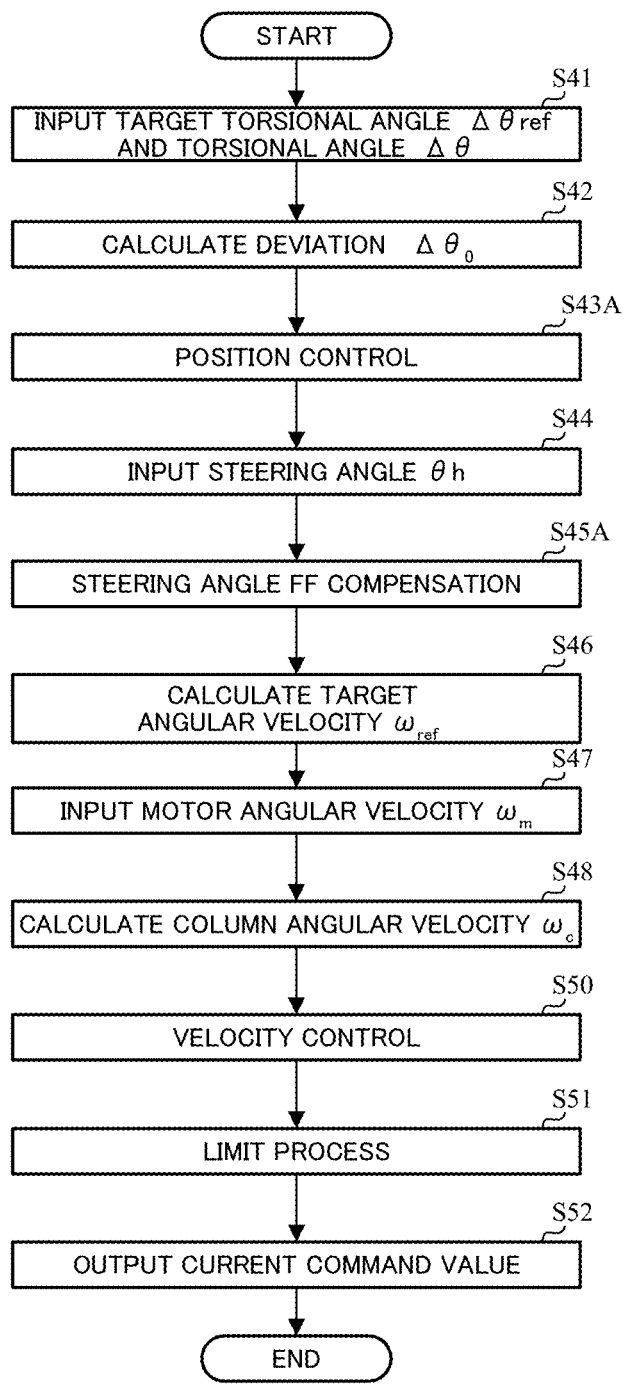
FIG. 20 is a flowchart showing an operation example of the torsional angle control section (the third embodiment)

The operation example of the third embodiment is shown in FIG. 20, and is almost the same as that of the second embodiment. Thus, in the third embodiment, the subtracting section 141 calculates the deviation $\Delta\theta_0$ (Step S42), and then the deviation $\Delta\theta_0$ is inputted into the position control section 142A and is compensated (Step S43A). The compensated target angular velocity $\omega$ref3 is inputted into the adding section 143. Next, the steering angle $\theta$h is inputted into the steering angle feedforward (FF) section 147 (Step S44) and is compensated (Step S45A), and the compensated target angular velocity $\omega$ref4 is inputted into the adding section 143 (Step S46). The subsequent operations are the same as those of FIGS. 9 and 16.

Next, the effect of the third embodiment will be described, shown in FIGS. 21A, 21B and 21C.

Figure 21A:
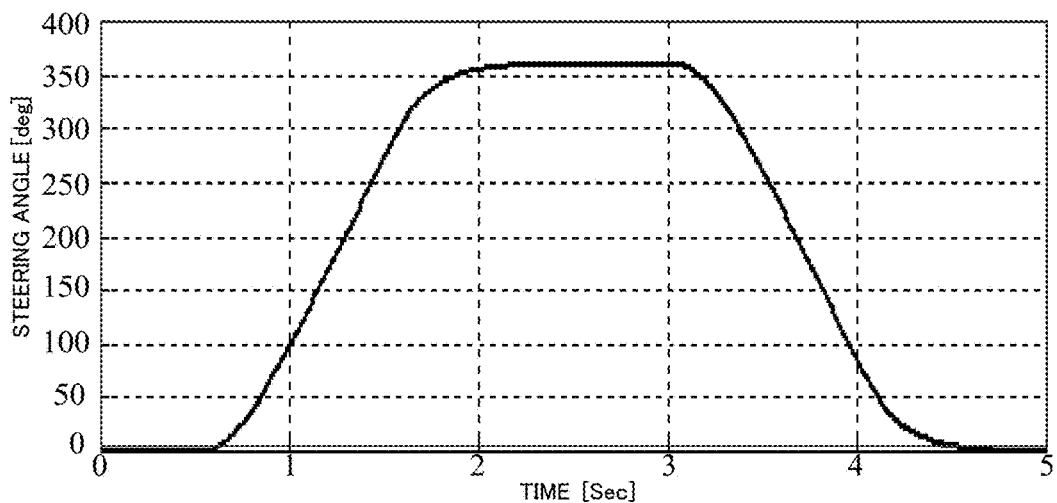
FIGS. 21A, 21B and 21C are characteristic diagrams for explaining an effect of the present invention.
Figure 21B:
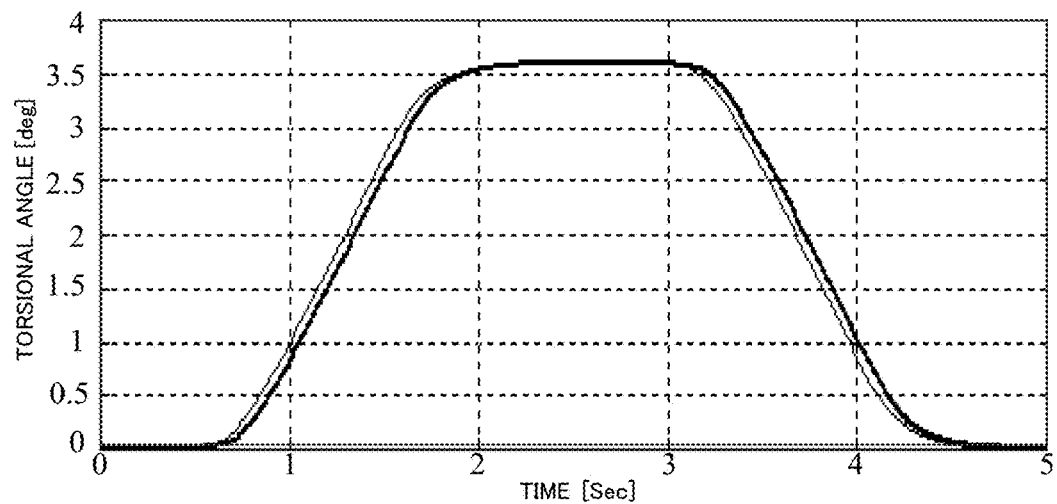
Figure 21C:
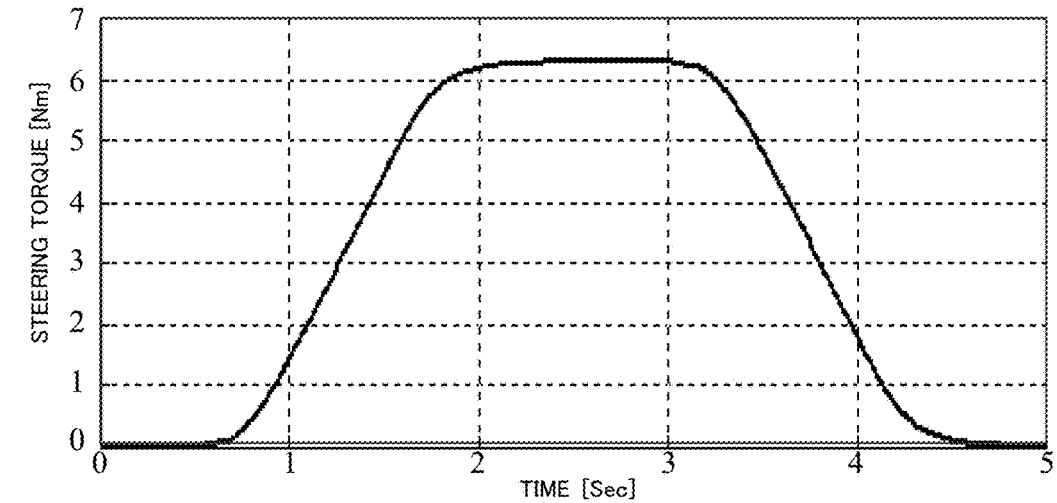

As shown in FIG. 21A, in a case that the steering angle $\theta$h is steered from about 0.6 [sec] to about 4.5 [sec], the target steering torque Tref shown by the thin line in FIG. 21B is outputted from the steering torque map 120 during the above time duration. The target torsional angle $\Delta\theta$ref is calculated by dividing the target steering torque Tref by the spring constant Ktor of the torsion bar. As shown in FIG. 21B, the torsional angle (the bold line) operates so as to slightly and belatedly follow-up the target torsional angle (the thin line). As a result, as shown in FIG. 21C, the steering torque which is emerged to the tactile feeling of the driver is almost the same as that of FIG. 21A.

With reference to the torsion bar torsional angle of the waveform diagrams shown in FIGS. 14, 17A, 17B, 21A, 21B and 21C, the sign adjustment is performed so that the value of the torsional angle is expressed by the changing in a plus direction when the value of the steering angle is changed in a plus direction. The expression of the target torsional angle is the same as that of the torsional angle.

As well, in the above first to third embodiments, the reduction ratio section 145 calculates the column angular velocity $\omega$c by multiplying the motor angular velocity $\omega$m with the reduction ratio "1/N", and the column angular velocity $\omega$c is inputted into the velocity control section 130. Alternatively, the motor angular velocity $\omega$m may directly be inputted into the velocity control section 130. The phase compensation may be interposed at a subsequent stage of or at a previous stage of the above steering torque map 120. In a case that the driver feels a comfortable feeling for the steering, the phase lead compensation may be set. Further, the current command value for the conventional assist control, the current command value of the self-aligning torque (SAT) estimation value, or the current command value for the handle vibration suppression may be added to the current command value Iref of the torsional angle control section 140. In the above embodiments, the column angular velocity is calculated based on the motor angular velocity. Instead of this method, the column angular velocity may be calculated based on the angle of the torsion bar lower-side (for example, the angle $\theta$2 measured by the lower-side angle sensor). In this case, in order to convert the angle dimension into the angular velocity dimension, the equivalent calculation of the general used differential (for example, the calculation by using the HPF, or the differential calculation) may be performed. The motor angular velocity $\omega$m inputted into the torsional angle control section 140 is not needed. Instead of the motor angular velocity $\omega$m, the column angular velocity which is calculated based on the angle of the torsion bar lower side may be inputted into the torsional angle control section 140. Moreover, the calculation of the reduction ratio "1/N" is not required.

Further, in the above embodiments, the proportional preceding-type PI-control (the I-P control) is used in the velocity control section. The generally used control such as the PI-control, a proportional (P) control, a proportional-integral-differential (PID) control, a differential preceding-type PID control (a PI-D control), a model matching control or a model reference control may be used in the velocity control section. The velocity control section may have a control configuration of at least one of the proportional compensation (P-compensation), the integral compensation (I-compensation) and the differential compensation (D-compensation), or a combination thereof, so as to follow-up the motor angular velocity to the target column angular velocity.

The above drawings are a conceptual diagram for qualitatively explaining the present invention, but the present invention is not limited to the above drawings. The above embodiments are one of the preferable embodiments of the present invention, but the present invention is not limited to the embodiments described herein. It will be apparent that various changes and modifications can be made without departing from the scope of the present invention. The present invention is applied to a column-type EPS and is explained. The present invention is not limited to an upstream-type EPS such as the column-type EPS, and can also be applied to a downstream-type EPS such as a rack and pinion-type EPS. Further, in a viewpoint that the feedback control is performed based on the target torsional angle, the present invention can be applied to a steer-by-wire (SBW) reaction force apparatus which comprises at least the torsion bar whose spring constant is any and the sensor for detecting the torsional angle, or the like.

Figure 22:
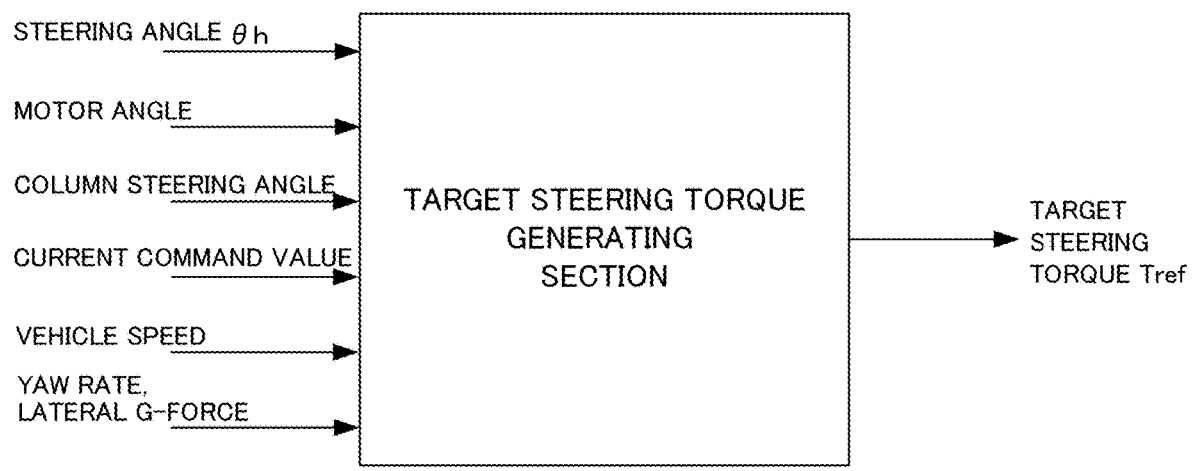
FIG. 22 is a diagram for explaining a general outline of a target steering torque generating section.

The main object of the present invention is to improve the followability of the torsional angle to the target torsional angle and consequently to improve the followability of the steering torque to the target steering torque Tref. Therefore, the calculation method of the target steering torque Tref as a target value is not limited to the methods according to the above embodiments. In the above embodiments, for example, as shown in FIG. 5, the target steering torque Tref is calculated by the steering torque map depending on the steering angle. As shown in FIG. 22, the target steering torque Tref may be calculated based on plural EPS/vehicle information such as the steering angle, the motor angle (or the motor angular velocity), the column steering angle (the column angle $\theta$c), the current command value, the vehicle speed, a yaw rate and a lateral g-force.

EXPLANATION OF REFERENCE NUMERALS 1 handle
2 column shaft (steering shaft, handle shaft)
3 reduction mechanism
10 torque sensor
12 vehicle speed sensor
14 steering angle sensor
20 motor
30 control unit (ECU)
100 EPS steering system/vehicle system
101 converting section
120 steering torque map
130 velocity control section
140 torsional angle control section
142 torsional angle feedback (FB) compensating section
142A position control section
144 steering angle disturbance compensating section
145 reduction ratio section
147 steering angle feedforward (FF) compensating section

The invention claimed is:

1. An electric power steering apparatus that has a torsion bar in a column shaft of a handle of a vehicle, and assist-controls a steering system by driving and controlling a motor connected to said column shaft based on a current command value, comprising:
   a target steering torque generating section to generate a target steering torque based on at least one of electric power steering (EPS)/vehicle information;
   a converting section to convert said target steering torque into a target torsional angle; and
   a torsional angle control section to calculate said current command value based on said target torsional angle, a steering angle, a torsional angle of said torsion bar and a motor angular velocity or a column angular velocity,
   wherein said torsional angle control section comprises:
   a torsional angle feedback compensating section to output a first target column angular velocity according to a deviation between said target torsional angle and said torsional angle;
   a steering angle disturbance compensating section to output a second target column angular velocity according to said steering angle;
   an adding section to output a third target column angular velocity obtained by adding said second target column angular velocity with said first target column angular velocity; and
   a velocity control section to output said current command value based on said third target column angular velocity and said column angular velocity,
   wherein said electric power steering apparatus performs a control so as to follow-up said torsional angle to said target torsional angle.

2. The electric power steering apparatus according to claim 1, wherein said torsional angle feedback section comprises of a gain value of a transfer function.

3. The electric power steering apparatus according to claim 1, wherein said steering angle disturbance compensating section comprises:
   a high pass filter;
   a phase compensating section for performing phase compensation; and
   a gain section to multiply a gain.

4. The electric power steering apparatus according to claim 1, wherein said steering angle disturbance compensating section comprises of a value of a transfer function that suppresses affection to said torsional angle due to variation of said steering angle, and improves followability of said torsional angle to said target torsional angle against an abrupt steering.

5. The electric power steering apparatus according to claim 4, wherein said value of said transfer function in said steering angle disturbance compensating section is determined by a frequency transfer function of a model of said steering system and a vehicle system.

6. The electric power steering apparatus according to claim 1, wherein said velocity control section performs at least one of a proportional compensation (a P-compensation), an integral compensation (an I-compensation) and a differential compensation (a D-compensation), or a combination thereof.

7. The electric power steering apparatus according to claim 1, wherein said column angular velocity is a signal that said motor angular velocity is reduced by using a reduction ratio, or an angular velocity signal calculated based on an angle detection value of lower side of said torsion bar.

8. An electric power steering apparatus that has a torsion bar in a column shaft of a handle of a vehicle, and assist-controls a steering system by driving and controlling a motor connected to said column shaft based on a current command value, comprising:
   a target steering torque generating section to generate a target steering torque based on at least one of electric power steering (EPS)/vehicle information;
   a converting section to convert said target steering torque into a target torsional angle; and
   a torsional angle control section to calculate said current command value based on said target torsional angle, a steering angle, a torsional angle of said torsion bar and a motor angular velocity or a column angular velocity,
   wherein said torsional angle control section comprises:
   a position control section to output a fourth target column angular velocity obtained by multiplying a deviation between said target torsional angle and said torsional angle with a position control gain;
   a steering angle disturbance compensating section to output a second target column angular velocity according to said steering angle;
   an adding section to output a third target column angular velocity obtained by adding said fourth target column angular velocity and said second target column angular velocity; and
   a velocity control section to output said current command value based on said third target column angular velocity and said column angular velocity,
   wherein said electric power steering apparatus performs a control so as to follow-up said torsional angle to said target torsional angle.

9. The electric power steering apparatus according to claim 8, wherein said steering angle disturbance compensating section comprises:
   a high pass filter;
   a phase compensating section for performing phase compensation; and
   a gain section to multiply a gain.

10. The electric power steering apparatus according to claim 8, wherein said steering angle disturbance compensating section comprises of a value of a transfer function that suppresses affection to said torsional angle due to variation of said steering angle, and improves followability of said torsional angle to said target torsional angle against an abrupt steering.

11. The electric power steering apparatus according to claim 10, wherein said value of said transfer function in said steering angle disturbance compensating section is determined by a frequency transfer function of a model of said steering system and a vehicle system.

12. The electric power steering apparatus according to claim 8, wherein said velocity control section performs at least one of a proportional compensation (a P-compensation), an integral compensation (an I-compensation) and a differential compensation (a D-compensation), or a combination thereof.

13. The electric power steering apparatus according to claim 8, wherein said column angular velocity is a signal that said motor angular velocity is reduced by using a reduction ratio, or an angular velocity signal calculated based on an angle detection value of lower side of said torsion bar.

14. An electric power steering apparatus that has a torsion bar in a column shaft of a handle of a vehicle, and assist-controls a steering system by driving and controlling a motor connected to said column shaft based on a current command value, comprising:

a target steering torque generating section to generate a target steering torque based on at least one of electric power steering (EPS)/vehicle information;

a converting section to convert said target steering torque into a target torsional angle; and a torsional angle control section to calculate said current command value based on said target torsional angle, a steering angle, a torsional angle of said torsion bar and a motor angular velocity or a column angular velocity, wherein said torsional angle control section comprises:

a position control section to output a fourth target column angular velocity obtained by multiplying a deviation between said target torsional angle and said torsional angle with a position control gain;

a steering angle feedforward compensating section to output a fifth target column angular velocity according to said steering angle;

an adding section to output a third target column angular velocity obtained by adding said fifth target column angular velocity and said fourth target column angular velocity; and a velocity control section to output said current command value based on said third target column angular velocity and said column angular velocity, wherein said electric power steering apparatus performs a control so as to follow-up said torsional angle to said target torsional angle.

15. The electric power steering apparatus according to claim 14, wherein said steering angle feedforward compensating section comprises:

a high pass filter to remove a noise which is relevant to a torque following-up control; and a gain section.

16. The electric power steering apparatus according to claim 11, wherein said steering angle feedforward compensating section comprises:

a phase lead filter to remove a noise which is relevant to a torque following-up control; and a gain section.

17. The electric power steering apparatus according to claim 14, wherein said velocity control section performs at least one of a proportional compensation (a P-compensation), an integral compensation (an I-compensation) and a differential compensation (a D-compensation), or a combination thereof.

18. The electric power steering apparatus according to claim 14, wherein said column angular velocity is a signal that said motor angular velocity is reduced by using a reduction ratio, or an angular velocity signal calculated based on an angle detection value of lower side of said torsion bar.

19. The electric power steering apparatus according to claim 17, further comprising a limiter which limits upper and lower values at a subsequent stage of said velocity control section.

20. The electric power steering apparatus according to claim 14, wherein said electric power steering (EPS)/vehicle information is a steering angle; and wherein said target steering torque generating section calculates said target steering torque by using a steering torque map based on said steering angle.

21. The electric power steering apparatus according to claim 20, wherein said steering torque map has a characteristic that said target steering torque becomes larger and is outputted when said steering torque becomes larger.

22. The electric power steering apparatus according to claim 20, wherein said target steering torque generating section makes said target steering torque be variable based on a vehicle speed.

* * * * *